United States Patent Office 2,748,881
Patented June 5, 1956

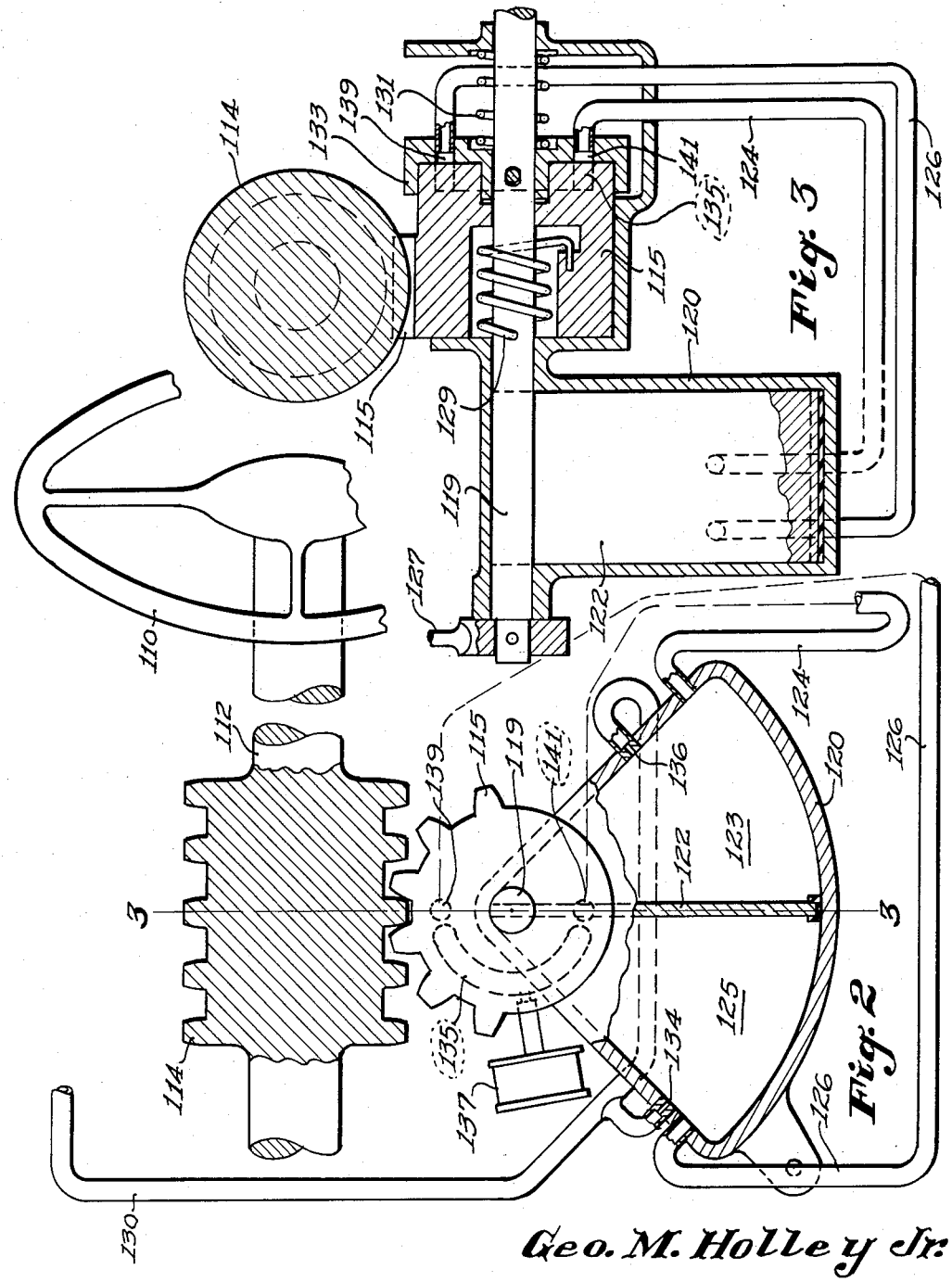

2,748,881

VACUUM TYPE POWER STEERING WITH CONTROL MEANS RESPONSIVE TO ENGINE AND VEHICLE SPEEDS

George M. Holley, Jr., Grosse Pointe Park, Mich., assignor to Holley Carburetor Company, Detroit, Mich., a corporation of Michigan Application August 14, 1952, Serial No. 304,364

2 Claims. (Cl. 180—79.2)

The object of this invention is to assist the driver of a car when steering at slow speed with the throttle closed, especially when parking. At high speed (either of the car or of the engine) the assistance derived from an automatic servo-mechanism can be dangerous. If I rely on inlet suction, this suction will be absent at wide open throttle, so the danger will be—to that extent—reduced. However, traveling at high speed, if an attempt is made to steer after the throttle has been temporarily closed, an accident is still quite likely. A governor responsive to car speed is then relied upon to render the device inoperative. Again, if stuck in sand or in a snow drift the engine is raced, an engine speed responsive valve is closed so as to prevent the steering mechanism becoming too powerful. An engine driven pump is relied on to take care of this situation so that an increase in hydraulic pressure at an excessive engine speed renders the device inoperative. A pump located behind the transmission will respond to car speed.

As an operative fluid for the servo-mechanism I use the atmospheric pressure and the inlet manifold suction. Such a pressure difference is at its maximum when the throttle is closed for idling. Hence, inherently this force is highest when the throttle is closed so that the tendency is for it not to function when the throttle is wide open.

Fig. 2 shows diagrammatically an alternative form.

Fig. 3 is a cross-sectional elevation on plane 3—3 of Fig. 2.

Figure 1:
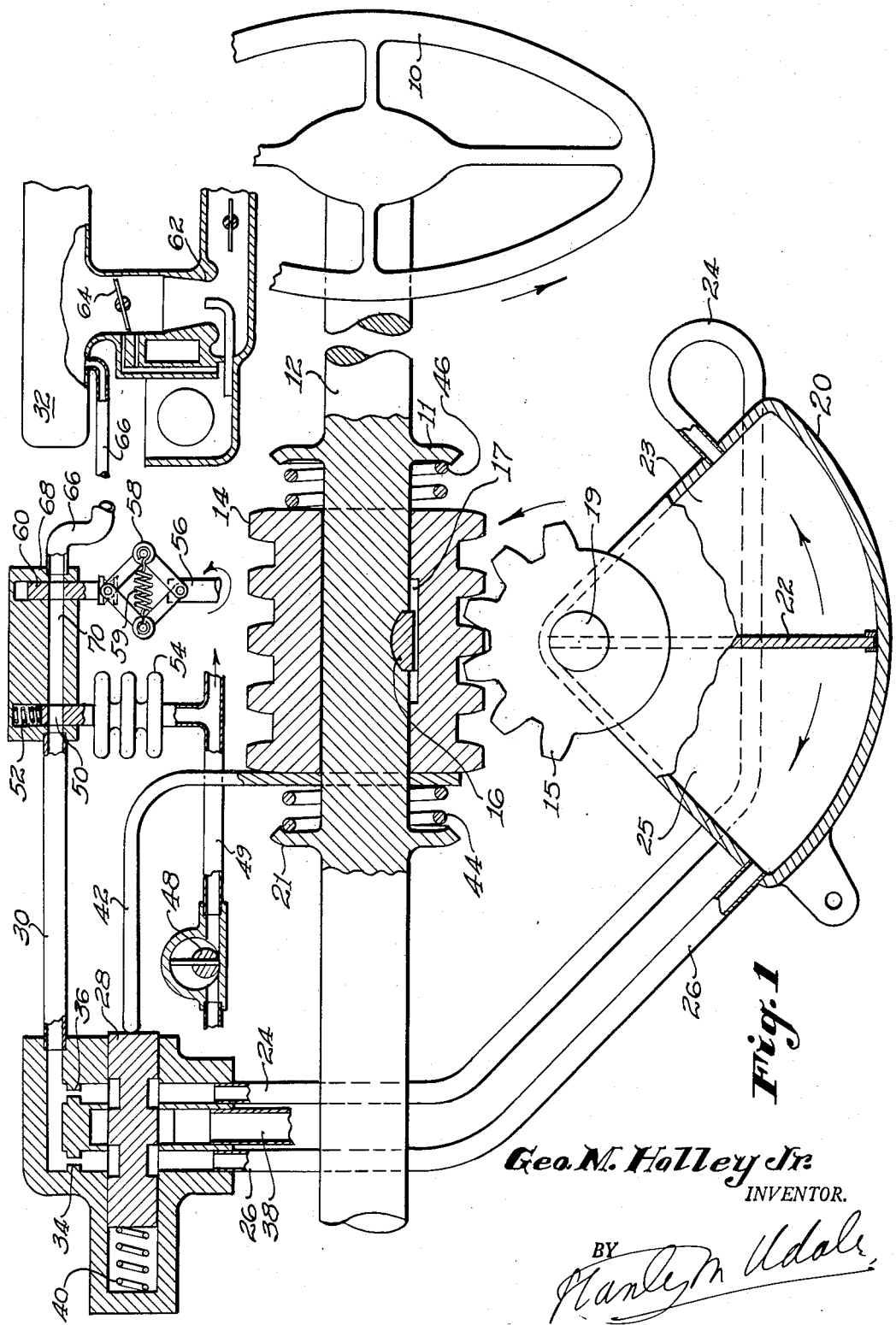
Figure 1 shows diagrammatically the preferred form of my invention.

In the figures, 10 is a steering wheel.

12 is a steering wheel shaft having two flanges 21 and 11.

14 is a steering worm located between 21 and 11 and mounted on the shaft 12.

16 is a key on the shaft 12 which drives the worm 14 through a slot 17 in the worm 14. Actually it is usual to broach the worm 14 as keys and a keyway, but keyways are obsolete in 1952.

15 is the driven gear which controls the steering which meshes with the worm 14.

19 is the shaft which carries the steering linkage (not shown).

20 is the pie shaped cylinder (comparable to a windshield wiper motor) which carries the rectangular shaped piston 22 mounted on the shaft 19 which drives the steering linkage.

24 is the vacuum pipe which imposes a vacuum on the right hand side of piston 22; that is, to chamber 23.

26 is the vacuum pipe which imposes a vacuum on the left hand chamber 25 adjacent to the piston 22.

28 is a servo-valve which controls the vacuum in pipes 24 and 26.

30 is the master vacuum pipe leading to an inlet manifold 32.

34 is a restriction that cooperates with pipe 26.

36 is a restriction that cooperates with pipe 24.

38 is the atmospheric passage which admits air at atmospheric pressure to operate the mechanism. This air must be clean, but an air cleaner is not shown as it forms no part of this invention and would needlessly complicate the drawing.

Spring 40 moves the servo-valve 28 to the right. Arm 42 moves the servo-valve 28 to the left. Arm 42 is connected to worm 14.

44 is a spring pushing the worm 14 to the right from the flange 21.

46 is a spring pushing the worm 14 to the left from the flange 11 to balance spring 44.

*Hydraulic governor 48—49—50—52—54*

The oil pump 48 may be driven by the drive to an automatic transmission or by the drive from an automatic transmission. Preferably, the oil pump responds to engine speed. This speed responsive device may be used alone or in conjunction with a second governor shown to the right of governor 48—49—50—52—54.

*Centrifugal governor 56—58—59—60*

56 is a shaft driven by the speedometer at car speed or at a speed proportional thereto.

58 is a centrifugal governor controlled by spring 59.

60 is a valve closed at high car speed.

62 is a carburetor to the car engine (not shown) supplying an explosive mixture to inlet manifold 32.

64 is a throttle valve which controls the vacuum in the inlet manifold 32.

66 is a pipe leading from the inlet manifold 32 to the casting 68 which contains the two valves 50 and 60 in series.

The passage 70 connects the two valves 50 and 60, and through them the passage 66 with passage 30. When either of these two valves 50 or 60 is closed, there is sufficient leak around the valve 28 so that the vacuum in pipes 24 and 26 is destroyed. Either the hydraulic or the centrifugal governor can be used alone, or both may be used together.

A spring may be interposed between shaft 19 and the driven gear 15. If much resistance develops the relative motion of the gear 15 to the shaft 19 may act as servo-mechanisms in place of the servo-valve 28. This would be the patentable equivalent of the construction illustrated.

Figures 2 and 3:

110 is the steering wheel.
112 is the shaft.
114 is the steering worm integral with shaft 112.
115 is the gear pinion engaging with 112.
120 is the pie shaped cylinder.
122 is the rectangular piston in 120.
124 is one atmospheric pipe leading to chamber 123.
126 is the other atmospheric pipe leading to chamber 125.
130 is the vacuum pipe from the inlet manifold (not shown).
134 is the restricted connection of the vacuum to chamber 125.
136 is the restricted connection of the vacuum to chamber 123.
119 is the shaft carrying the steering link 127.
129 is a stiff coil spring through which this driven gear 115 drives the steering link 127. This spring 129 is locked on the left hand end to shaft 119, and on the right hand end to pinion gear 115.
131 is the spring which presses the valve 133 against 115.

Figure 2 in broken lines shows port 135 communicating with small air cleaner 137.

Ports 139 and 141 communicate with port 135 whenever valve 133 moves relative to the driven gear 115.

Pipes 124 and 126 connect ports 141 and 139 with chambers 123 and 125.

In Figures 2 and 3:

The shaft 112 and gear 114 engage driven gear 115, and when the steering link 127 encounters opposition, the spring 129 yields and places one side or the other of piston 122 in communication with the atmosphere. This pressure overpowers the vacuum from pipe 130 because of the small size of the restrictions 134 and 136. Hence, the pipes 124, 126 and 130 may be arranged to cause the piston 122 to help steer the car.

What I claim is:

1. Means for assisting a car operator in steering when parking a car having a throttle controlled engine comprising a steering wheel, a steering post, a worm mounted on said post, a driven gear engaging said worm and driven thereby, a steering shaft driven by said driven gear, a booster cylinder, a piston therein connected to said driven gear, an engine generated source of vacuum, two restricted pipes leading from said vacuum source to said cylinder, one on each side of said piston, a servo-valve, connected to said worm, located between the source of vacuum and the cylinder and connected to said pipes, yieldable means interposed between the steering post and the worm and adapted when resistance is encountered to permit said worm to move so as to move said servo-valve so as to apply engine suction to one side or the other of said piston and thus help the car operator steer as the car is parked, and in which there are two valves located between the engine source of suction and said servo-valve, an engine driven speed responsive means operatively connected to one of said two valves, a car speed responsive means operatively connected to the other of said two valves, so that at both high car speed and at high engine speed the booster cylinder becomes relatively ineffective.

2. Means for assisting a car operator in steering when parking a car having a throttle controlled engine comprising a steering wheel, a steering post, a worm mounted on said post, a driven gear engaging said worm and driven thereby, a steering shaft driven by said driven gear, a booster cylinder, a piston therein connected to said driven gear, an engine generated source of vacuum source, two restricted pipes leading from said vacuum to said cylinder, one on each side of said piston, a servo-valve connected to said worm located between the source of vacuum and the cylinder and connected to said pipes, yieldable means interposed between the steering post and the worm and adapted when resistance is encountered to permit said worm to move and thus move said servo-valve so as to apply engine suction to one side or the other of said piston and thus help the car operator steer as the car is parked, and in which there is an engine driven oil pump pressure speed responsive means comprising an oil pump directly driven by the engine and a valve operated thereby located between the engine source of suction and said servo-valve so that at high engine speed the source of suction is rendered relatively ineffective to assist steering through said booster cylinder.

References Cited in the file of this patent

UNITED STATES PATENTS

| | | |
|---|---|---|
| 1,817,903 | Aikman | Aug. 11, 1931 |
| 1,900,218 | Aikman | Mar. 7, 1933 |
| 2,213,271 | Davis | Sept. 3, 1940 |
| 2,356,492 | Smith | Aug. 22, 1944 |